United States Patent Office 3,324,092
Patented June 6, 1967

3,324,092
PRODUCTION OF POLYMERS OF OLEFINES
Herbert Naarmann, Ludwigshafen (Rhine), and Ernst-Guenther Kastning, Assenheim, Pfalz, Germany, assignors to Badische Anilin- & Soda-Fabrik Aktiengesellschaft, Ludwigshafen (Rhine), Germany
No Drawing. Filed Nov. 5, 1963, Ser. No. 321,432
Claims priority, application Germany, Nov. 9, 1962, B 69,557
6 Claims. (Cl. 260—88.1)

This invention concerns a new process for the production of polymers of olefins. More specifically, the invention concerns a process for the production of polymers of olefins in which novel catalysts are used.

It is known that olefins polymerize in the presence of certain catalysts according to an anionic reaction mechanism. The two groups of catalysts may be used for this reaction, namely (i) organometallic compounds or alkali metals and (ii) combined catalysts consisting of a compound of a transition metal and an organometallic compound.

These catalysts are sensitive to air and water and they are dangerous to handle on account of the fact, for example, that they ignite spontaneously in air. A further disadvantage in the use of these catalysts is that the monomers require extensive purification before the polymerization in order to free them from water.

Processes have also been described for the polymerization of olefins with catalysts which are obtained by irradiating metal chelate compounds in solutions which must be free from water, oxygen and polar compounds, with energy-rich rays, such as X-rays, $\beta$-rays and $\gamma$-rays and neutron and proton rays. The production of the catalysts and the purification of the solvents which are suitable for the purpose are complicated processes, in particular, as operation with energy-rich rays requires extensive protective measures. A further disadvantage is that the polymerization must be carried out with exclusion of water and atmospheric oxygen. In addition, energy-rich rays initiate the polymerization of ethylenically unsaturated compounds so that polymerization according to different mechanism takes place simultaneously with the result that non-uniform polymers are produced. It is an object of this invention to provide a process for the production of homopolymers and copolymers of olefins in which special purification of the monomers is not necessary. Another object of the invention is to provide a polymerization process in which catalysts which ignite spontaneously are not used. A further object of the invention is the production of copolymers of olefins and other ethylenically unsaturated polymerizable compounds. Yet another object of the invention is the use of particularly effective polymerization catalysts.

In accordance with this invention the said objects are achieved by using as the polymerization catalyst a mixture of:

(a) at least one metal chelate compound of a metal from groups IB, IIB, IVA, VA, VB, VIB, VIIB and VIII of the Periodic System or of the rare earths (Handbook of Chemistry and Physics, 38th edition, pages 394 and 395) and (b) at least one unsaturated aliphatic cyclic hydrocarbon having five to twelve carbon atoms in the ring.

The process according to this invention may be used for the polymerization of polymerizable olefins having two to eight carbon atoms and one or two terminal olefinic double bonds, such as olefins with two to four carbon atoms and a single terminal double bond, as for example ethylene, propylene, n-butylene-(1), isobutylene and vinyl-aromatic compounds, such as styrene and also olefins having two terminal double bonds, such as butadiene-1,3, isoprene and 2,3-dimethylbutadiene-1,3.

The process according to this invention may also be used for the production of copolymers of polymerizable olefins and copolymers of polymerizable olefins with other ethylenically unsaturated monomeric polymerizable compounds. Copolymers of olefins are defined as polymers which contain at least 50% by weight of olefins in polymerized form.

Suitable comonomers are, for example, the following ethylenically unsaturated monomeric polymerizable compounds: halostyrenes, styrene-sulfonic acid, $\alpha,\beta$-unsaturated carboxylic acids, such as acrylic acid and methacrylic acid, esters of acrylic acid with alcohols having one to eight carbon atoms, such as methyl acrylate, ethyl acrylate, n-butyl acrylate, esters of methacrylic acid with alcohols having one to eight carbon atoms, such as methyl methacrylate and tertiary-butyl acrylate, vinyl esters of alcohol having one to ten carbon atoms, such as vinyl acetate, vinyl proprionate, vinyl benzoate, vinyl ethers of alcohols having one to four carbon atoms, such as vinyl methyl ether and vinyl n-butyl ether, vinyl chloride, vinylidene chloride, nitriles and amides of $\alpha,\beta$-unsaturated carboxylic acids, such as acrylonitrile, methacrylonitrile, acrylamide, methacrylamide, vinyl ketones having four to seven carbon atoms, such as methyl vinyl ketone and isopropenyl vinyl ketone, N-vinyl compounds, such as vinylpyrrolidone, vinyl caprolactam, vinylimidazole and vinylcarbazol, fumaric acid, maleic acid, maleic anhydride, maleic imide, esters of maleic acid having one to six carbon atoms, such as diethyl maleate, dimethyl maleate, di-n-butyl maleate and the corresponding esters of fumaric acid.

Metal chelate compounds are defined as those compounds in which a metal atom is linked to two functional groups of a molecule by main valencies and coordinate bonds. Compounds of this type are, for example, described in the book, "Chemistry of the Metal Chelate Compounds," by Arthur E. Martell and Melvin Calvin, New York, Prentice-Hall, Inc., 1952.

Compounds suitable for the formation of metal chelate compounds (a) containing two functional groups which can become linked with metal atoms, one group being linked by main valencies and the other by coordinate bonds, are particularly $\beta$-diketones, such as acetylacetone, $\beta$-ketocarboxylic esters, such as ethyl- and 3-methyl-butene-(1)-ol-(3)-acetoacetate, amino acids having two to six carbon atoms, such as glycine and histidine, hydroxyaldehydes, such as salicylaldehyde, and also o-aminophenol, o-aminobenzoic acid or 4,5-phenanthroline (o-phenanthroline).

The chelate complex compounds, for example in the case of acetylacetonate, may be represented by the following formula:

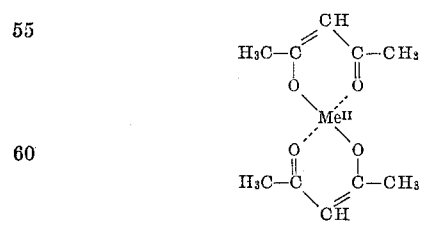

In this formula, $Me^{II}$ denotes a divalent metal from the groups specified above. Me may, however, also be monovalent, trivalent or of even higher valency. The production of the catalysts does not form the subject of this invention.

Examples of suitable metal chelate complex compounds are: copper acetoacetic acid ethyl ester, manganic acetylacetonate, cobaltic acetylacetonate, chromic acetylacetonate, chromium anthranilate, chromium glycinate, cobaltic acetylacetonimide, manganic anthranilate, manganeous acetoacetic acid ethyl ester, nickel salicylaldehyde, ceric acetylacetonate and vanadic acetylacetonate.

Examples of suitable unsaturated aliphatic cyclic hydrocarbons having five to twelve carbon atoms in the ring (b) which are to be used in admixture with the metal chelate complex compounds as polymerization catalysts are: cyclopentadiene, cyclohexadiene, cycloheptadiene, cyclooctadiene, cyclooctatetraene, cyclooctadiene-1,5, cyclooctadiene-1,4, cyclooctadiene-1,3, the cyclododecatrienes-1,5,9, for example cyclododecatriene-1,5,9 (trans, trans, trans), cyclododecatriene-1,5,9 (cis, trans, trans) and cyclododecatriene-1,5,9 (cis, cis, cis).

For example it is particularly advantageous to use mixtures of cupric acetoacetic acid ethyl ester and cyclooctadiene-1,3, manganic acetylacetonate and cyclododecatriene-1,5,9 (trans, trans, trans), cobaltic acetylacetonate and cyclopentadiene, and chromic histidinate and cyclooctadiene-1,5.

Sometimes the effectiveness of the mixture of chelate complex compound and unsaturated cyclic hydrocarbon as an initiator may be increased by adding organic halogen compounds thereto, for example carbon tetrachloride, chloroform, trichloroacetamide, amyl chloride or dichloroethylene.

The metal chelate complex compounds (a) are used generally in amounts between 0.001 and 5%, preferably between 0.01 and 1%, by weight with reference to the monomeric compounds.

From 0.01 to 50 parts by weight of one or more unsaturated aliphatic cyclic hydrocarbons (b) is used for each 1 part by weight of one or more metal chelate complex compounds (a).

With the catalyst mixture to be used according to this invention it is possible to copolymerize monomers which could only be incompletely copolymerized or could not be copolymerized at all with the prior art initiator mixtures. For example butadiene may be copolymerized with ethylene, butadiene with acrylic acid, ethylene with vinyl ethers, propylene with acrylic acid or acrylamide, or styrene with ethylene by the process according to this invention.

Some of the polymers have a sterically arranged structure. For example polyethylene prepared by the process according to this invention has a high crystalline fraction. The density is more than 0.95. In the polymerization of dienes, the 1,4-linkage is favored. The molecular weights of the polymers obtained may be varied within a wide range according to the polymerization conditions.

Polymerization may be carried out at temperatures between 0° and 180° C. according to the monomers to be polymerized. For example, ethylene may be homopolymerized or copolymerized at 50° to 150° C., styrene, butadiene and isoprene at 20° to 130° C. The polymerization may be carried out at any pressure and pressures up to about 2000 atm. gauge or more may be used if necessary.

Monomers may be homopolymerized or copolymerized in substance using the catalyst mixtures according this invention. The monomers may however be mixed with inert auxiliary liquids for the polymerization. Such auxiliary liquids are for example aliphatic, cycloaliphatic and aromatic hydrocarbons, such as n-pentane, n-hexane, isohexane, n-heptane, n-octane, isooctane, cyclohexane, methylcyclohexane, benzene, toluene, o-xylene, m-xylene, p-xylene, ethylbenzene, cumene, isopropylbenzene, tetrahydronaphthalene or decahydronaphthalene. Ethers are also suitable, such as diethyl ether, dibutyl ether, tetrahydrofuran, dioxane, glycol dimethyl ether or glycol phenylmethyl ether, and also alcohols and ketones, such as methanol, ethanol, propanol, isopropanol, butanols, cyclohexanol, benzyl alcohol and acetone.

The polymerization may be carried out continuously or batchwise. The initiator mixture may be introduced into the reactor in admixture with the monomers or with an auxiliary liquid.

The mixtures of the metal chelate complex compounds (a) with unsaturated aliphatic cyclic hydrocarbons (b) have a greater activity than the pure chelate compounds. Thus for example higher rates of polymerization and higher yields are obtained with these mixtures. Moreover polymerization may be carried out at considerably lower temperatures at which the metal chelate complex compounds alone are not active or are inadequately active.

The unsaturated cyclic hydrocarbons act as co-catalysts but by themselves have no activity as polymerization catalysts.

The invention is further illustrated by the following examples. The parts specified in the examples are parts by weight. The K-values are determined by the method of H. Fikentscher, "Cellulose-chemie," volume 13 (1932), 58.

EXAMPLE 1

Mixtures composed of 20 parts of styrene, 0.1 part of one of the metal chelate complex compounds set out in Table 1 and 0.01 part of cyclooctadiene-1,5 are heated at 100° to 120° C. for two hours. The polymer obtained is then precipitated in methanol. The K-value is measured in 1% solution in cyclohexanone. The results are given in Table 1. For purposes of comparison, styrene is polymerized under the same conditions but with only the metal chelate complex compound and the results achieved are indicated in (parentheses) in the table.

TABLE 1

| Metal chelate complex compound | Reaction temp., ° C. | Yield, parts | Conversion, percent | K-value |
| --- | --- | --- | --- | --- |
| Manganic acetylacetonate | 100 | 14.6 (4.9) | 73 (24.5) | 71.5 (68) |
| Manganic anthranilate | 100 | 16.8 (6.2) | 84 (31) | (72) |
| Maganic acetoacetic acid ethyl ester | 100 | 18.6 (5.8) | 93 (29) | (71) |
| Cobaltic acetylacetonate | 110 | 12.2 (—) | 61 (—) | (—) |
| Cobaltic histidinate | 110 | 12.0 (1.2) | 60 (6) | (41) |
| Nickelous salicylaldehyde | 110 | 4.6 (0.9) | 23 (4.5) | 69 (63) |
| Rhodium III acetylacetonate | 110 | 7.6 (1.3) | 38 (6.5) | 54.3 (47.5) |
| Chromic glycinate | 120 | 11.8 (—) | 59 (—) | 42 (—) |
| Molybdenum III acetylacetonate | 120 | 10.8 (1.8) | 54 (9) | 56.5 (43) |
| Cupric acetoacetic acid ethyl ester | 100 | 3.2 (—) | 16 (—) | 62.2 (—) |
| Silver II phenanthrolinate | 100 | 4.8 (—) | 24 (—) | 58.7 (—) |
| Mercuric acetylacetonate | 100 | 3.7 (—) | 18.5 (—) | 69 (—) |

EXAMPLE 2

Mixtures of 20 parts of styrene, 0.1 part of manganic acetylacetonate and 0.1 part of one of the unsaturated cyclic hydrocarbons given in Table 2 are heated at 100° C. for one hour. The yield of polymer is then determined by precipitation of the polymer obtained in methanol. The K-value is measured in 1% solution in cyclohexanone.

TABLE 2

| Unsaturated cyclic hydrocarbon | Yield in parts | Conversion, percent | K-value |
|---|---|---|---|
| Cyclopentadiene | 14.1 | 70.05 | 69.3 |
| Cyclohexadiene | 15.6 | 78 | 72.0 |
| Cyclopentatriene | 14.8 | 74 | 71.0 |
| Cyclooctadiene-1,3 | 17.2 | 86 | 73 |
| Cyclooctadiene-1,4 | 15.2 | 76 | 68 |
| Cyclooctadiene-1,5 | 14.6 | 73 | 71.5 |
| Cyclooctatetraene | 12.8 | 64 | 62.6 |
| Cyclododecatriene-1,5,4 (trans, trans, trans) | 14.45 | 72.25 | 73.4 |
| Without addition | 4.9 | 24.5 | 68 |

Styrene is polymerize as above described but using copper acetoacetic acid ethyl ester as the metal chelate complex compound instead of manganic acetylacetonate. The results are shown in Table 2a.

TABLE 2A

| Unsaturated cyclic hydrocarbon | Yield in parts | Conversion, percent | K-value |
|---|---|---|---|
| Cyclooctadiene-1,5 | 3.2 | 16 | 58.7 |
| Cyclooctadiene-1,3 | 4.8 | 24 | 57.5 |
| Cyclopentadiene | 3.5 | 17.5 | 56.4 |
| Cyclododecatriene-1,5,9 (trans, trans, trans) | 2.8 | 14 | 61 |
| Without addition | | | |

EXAMPLE 3

150 parts of isobutylene, 200 parts of benzene, 70 parts of acrylamide, 0.1 part of manganic acetylacetonate and 0.1 parts of cyclooctadiene-1,3 are heated for ten hours at 100° C. in an autoclave. 122 parts of a copolymer is obtained having a K-value of 98 (0.5% solution in ethanol). The content of acrylamide in polymerized form is 57.4% by weight.

By using 2-methyl-4,4-dimethylpentene-(1) (diisobutylene) instead of isobutylene, 130 parts of a copolymer having a K-value of 107 (0.5% solution in ethanol) is obtained. The content of acrylamide in polymerized form is 53.8% by weight.

EXAMPLE 4

76 parts of propylene, 200 parts of benzene, 50 parts of acrylamide, 0.1 part of nickelous acetoacetic acid-3-methylbutene-(1)-ol-(3) ester and 0.1 part of cyclododecatriene-1,5,9 are heated for ten hours at 120° C. in an autoclave. 77.5 parts of a copolymer having a K-value of 81 (in a 1% solution in dimethylformamide) is obtained. The content of acrylamide in polymerized form is 64.5% by weight. This copolymer has a glass temperature of 123° C.

EXAMPLE 5

100 parts of styrene and 10 parts of cyclopentadiene are mixed in an autoclave. 0.5 part of manganic acetylacetonate is used as the initator for the polymerization. The polymerization mixture is heated at 105° C. for fifteen hours. 108 parts of a copolymer is obtained which according to infrared analysis contains about 7% by weight of cyclopentadiene in polymerized form.

EXAMPLE 6

A mixture of 2000 parts of benzene and 100 parts of maleic anhydride is placed in an autoclave and 1 part of cobaltic acetylacetonate and 1 part of cyclooctadiene-1,3 are added. Ethylene is first forced in at room temperature up to a pressure of 50 atmospheres gauge. Then the autoclave is heated to 100° C. and ethylene is forced in until a pressure of 600 atmospheres gauge has been reached. After initiation of the polymerization, the pressure falls; the pressure is kept at 600 atmospheres gauge by continuously forcing in ethylene. Polymerization is carried on for ten hours. 1985 parts of a copolymer of 95% by weight of ethylene and 5% by weight of maleic anhydride is obtained.

This copolymer has a K-value of 35 (in 1% solution in decahydronaphthalene).

EXAMPLE 7

5 parts of copper acetoacetic acid ethyl ester, 5 parts of cyclododecatriene-1,5,9 (trans, trans, trans) and 1 part of hexachloroethane are added to a mixture of 2000 parts of benzene and 200 parts of maleic acid N-hydroxyethylmonoamide:

$$\begin{array}{l} CH-CO-N-CH_2-CH_2-OH \\ \parallel \\ CH-COOH \end{array}$$

Ethylene is forced in as described in Example 6 and polymerized. 1520 parts of a copolymer of 87% by weight of ethylene and 13% by weight of maleic acid N-hydroxyethylmonoamide is obtained. This copolymer has a K-value of 23 (in 1% solution in decahydronaphthalene).

If methacrylic N-hydroxyethylamide:

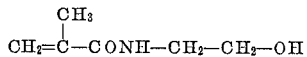

be used instead of maleic N-hydroxyethylmonoamide, 2250 parts of a copolymer of 91.1% by weight of ethylene and 8.9% by weight of methacrylic N-hydroxyethylamide is obtained. This copolymer has a K-value of 38 (in 1% solution in decahydronaphthalene).

EXAMPLE 8

100 parts of styrene, 10 parts of N-diethylaminomethylmethacrylamide and 100 parts of benzene are mixed in an autoclave. 0.1 part of nickelous acetoacetic acid propargyl ester and 1 part of cyclododectariene-1,5,9 (trans, trans, cis) are used as the initiator for the polymerization. Polymerization is carried on at 105° C. for ten hours. 110 parts of a copolymer having a K-value of 64.5 (in 1% solution in cyclohexanone) is obtained.

The copolymer contains 9% by weight of N-diethylaminomethylmethacrylamide in polymerized form.

EXAMPLE 9

80 parts of styrene, 20 parts of vinyl acetate, 0.5 part of rhodium-III acetylacetonate and 1 part of cyclopentadiene, together with 0.5 part of chloroform are heated in an autoclave for five hours at 110° C. 93.5 parts of a copolymer having a K-value of 65.5 (in 1% solution in cyclohexanone) is obtained.

This copolymer contains 14.5% by weight of vinyl acetate in polymerized form.

EXAMPLE 10

1 part of ceric acetylacetonate and 5 parts of cyclopentadiene are added to 20,000 parts of benzene in an autoclave. Ethylene is forced in to a pressure of 700 atmospheres gauge and polymerization is carried on for ten hours at 125° C.

1180 parts of polyethylene having a K-value 90.5 (in 1% solution in decahydronaphthalene) and a density of 0.927 is obtained. The polyethylene contains eighteen $CH_3$-groups to 1000 carbon atoms. This value is ascertained by infrared measurements.

EXAMPLE 11

1 part of cupric acetylacetonate and 2 parts of cyclooctadiene-(1,5) are added to 10,000 parts of cyclohexane in an autoclave. This mixture is stirred for one hour at 50° C.

Ethylene is then forced in up to a pressure of 500 atmospheres gauge, heated to 140° C. and polymerized within five hours at 1500 atmospheres gauge ethylene pressure.

585 parts of polyethylene having a K-value of 94.5 (1% solution in decahydronaphthalene) and a density of 0.955. The polyethylene contains four methyl groups to 1000 carbon atoms. This value is determined by infrared measurements.

EXAMPLE 12

A solution of 100 parts of butadiene in 100 parts of benzene is slowly added to a mixture of 1 part of silver-I acetylacetonate and 0.5 part of vanadium-III acetylacetonate and 5 parts of cyclooctadiene-1,3 at 50° C. in an autoclave. Polymerization is carried on for fifty hours at 50° C.

The polymer is precipitated with methanol and dried. 68.0 parts of a polybutadiene is obtained which has a K-value of 84 (1% solution in toluene) and which contains 48% by weight of 1,4-cis components, 34% by weight of trans components and 28% by weight of 1,2-vinyl components.

If the procedure described above is followed but with the silver-I acetylacetonate replaced by one of the chelate complexes indicated in Table 3, polybutadienes are obtained which have the following properties:

TABLE 3

| Chelate complex | Yield | 1,4-cis | Component | |
|---|---|---|---|---|
| | | | 1,2-vinyl | 1,4-trans |
| Thallium-I acetylacetonate | 56 | 62 | 10 | 28 |
| Zinc-II acetylacetonate | 79 | 59 | 8 | 33 |
| Lead-II acetylacetonate | 67 | 68 | 21 | 11 |
| Copper-II acetylacetonate | 81 | 23 | 36 | 41 |

EXAMPLE 13

100 parts of isoprene and 200 parts of benzene are added at 20° C. to a mixture of 0.5 part of antimony-V tetrachloroacetylacetonate, 1 part of manganic diaceto acetic ester and 5 parts of dicyclopentadiene in an autoclave. Polymerization is carried on for sixty hours at 40° C. After the product has been worked up, 71 parts of a polyisoprene having a K-value of 92.5 (1% solution in toluene) is obtained.

EXAMPLE 14

A mixture of 1 part of manganic o-aminophenolate and 5 parts of cyclopentadiene is added to 100 parts of styrene and 200 parts of benzene in an autoclave and 100 parts of butadiene is forced in. Polymerization is carried on for five hours at 100° C.

After the production has been worked up and dried, 182 parts of a polybutadiene having a K-value of 97 (0.5% solution in toluene) is obtained.

If the analogous rhodium salt is used, 168.5 parts of a polymer having a K-value of 84.5 is obtained.

We claim:

1. A process for the production of polymers of polymerizable olefins haviing two to eight carbon atoms and one to two terminal olefinic double bonds which comprises bringing the olefin into contact with a mixture consisting essentially of (a) a metal chelate compound of at least one metal selected from groups IB, IIB, IVA, VA, VB, VIB, VIIB and VIII of the Periodic System and the rare earths and a member selected from the group consisting of β-diketones, β-ketocarboxylic esters, aminoacids having two to ten carbon atoms, salicylaldehyde, o-aminophenol and 4,5-phenanthroline and (b) a cyclic unsaturated aliphatic hydrocarbon having five to twelve carbon atoms in the ring.

2. A process as claimed in claim 1 wherein the olefin is copolymerized with other ethylenically unsaturated monomeric polymerizable compounds.

3. A process as set forth in claim 1 wherein the mixture contains component (a) in amounts between 0.001 and 5% by weight with reference to the monomeric compound, and 0.01 to 50 parts by weight of component (b) for each 1 part by weight of component (a).

4. A process as set forth in claim 2 wherein the mixtures contains component (a) in amounts between 0.001 and 5% by weight with reference to the monomeric compound, and 0.01 to 50 parts by weight of component (b) for each 1 part by weight of component (a).

5. A process as set forth in claim 1 wherein the olefin is polymerized in admixture with an auxiliary liquid.

6. A process as claimed in claim 2 wherein the olefin and the other ethylenically unsaturated monomeric polymerizable compound are polymerized in admixture with an auxiliary liquid.

References Cited

UNITED STATES PATENTS 3,058,963  10/1962  Vandenberg _____ 260—94.9

JOSEPH L. SCHOFER, *Primary Examiner.*

LAWRENCE EDELMAN, *Assistant Examiner.*